J. H. HAMLIN.
VEGETABLE PEELER.
APPLICATION FILED MAY 21, 1919.

1,347,091.
Patented July 20, 1920.
2 SHEETS—SHEET 1.

WITNESSES
Frank C. Palmer.
Geo. H. Beeler

INVENTOR
J. H. Hamlin
BY
ATTORNEYS

J. H. HAMLIN.
VEGETABLE PEELER.
APPLICATION FILED MAY 21, 1919.

1,347,091.

Patented July 20, 1920.
2 SHEETS—SHEET 2.

WITNESSES:
William P. Goebel.
Geo. H. Beeler

INVENTOR
J. H. Hamlin
BY
ATTORNEYS

UNITED STATES PATENT OFFICE.

JOHN H. HAMLIN, OF NEW YORK, N. Y.

VEGETABLE-PEELER.

1,347,091.

Specification of Letters Patent. Patented July 20, 1920.

Application filed May 21, 1919. Serial No. 298,585.

*To all whom it may concern:*

Be it known that I, JOHN H. HAMLIN, a citizen of the United States, and a resident of the city of New York, borough of Manhattan, in the county and State of New York, have invented a new and Improved Vegetable-Peeler, of which the following is a full, clear, and exact description.

This invention relates to vegetable cutters and peelers and has particular reference to means for the hand paring or peeling of potatoes or other analogous vegetables.

Among the objects of the invention is to provide an implement adapted to easily and quickly remove the peeling of a potato without wasting the best part of the potato or the part that has the best flavor directly beneath the skin.

Another object of the invention is to provide a hand operated implement having a self-contained reservoir of water for flushing the surface of the vegetable being peeled.

A further object of the invention is to provide an abrasive implement for scraping or abrading off the peeling of a vegetable, the implement having in connection therewith sharp points or edges for removing eyes or faulty portions of the vegetable.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1:
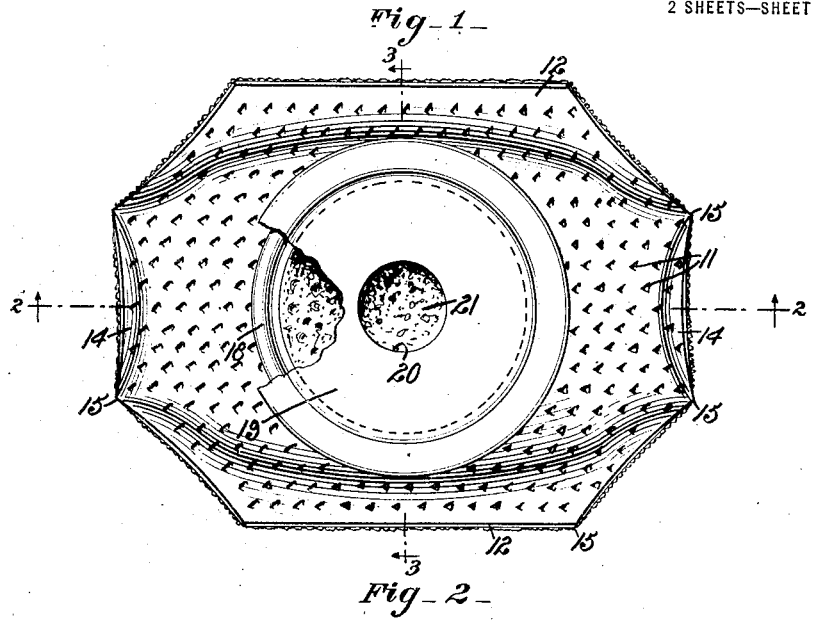
Figure 1 is a plan view of a preferred embodiment of the invention, a portion being broken away to show the cap structure.

Referring now more particularly to the drawings, I show an implement comprising a body portion 10 of sheet metal or its equivalent, the same being punctured at numerous points as indicated at 11, providing on the lower surface a mass of burs 11'. These punctures serve a number of different purposes, among which may be noted the following: First, these burs and openings primarily serve to bond and assist in holding the abrading materials to the body; secondly, there are thus provided, especially at the central portion of the body, any suitable number of small openings or pores for the passage of water, and finally, they serve to give rigidity to the body, thus serving to keep the abradant surface from scaling off and serving to give depth of material.

The body described may be of any desired size or form, but preferably of a size and form convenient for hand operation. The side edges 12 are preferably turned upwardly far enough so that the operator's fingers may span both of them while the central and flatter portion 13 of the body acts upon the potato or other vegetable. The ends 14 are turned upward somewhat, forming rounded flanges, and where the side and end portions merge together are formed lips or angular points 15, any one or more of which may be used for gouging out the eyes or faulty portions of the vegetable, or any one of the side edges of the abrasive body may be employed for cutting out faulty portions or streaks in the body of the vegetable.

Figure 4:
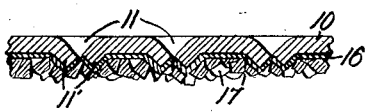
Fig. 4 is an enlarged detail indicating the manner of constructing the abrasive body portion.

As shown especially in Fig. 4, the plate of which the body is constructed and punctured, as above described, is faced with a coating of cement 16 or the like through which any suitable abrasive material 17 may be secured to the body. This material is preferably of a coarse gritty nature and acts easily and rapidly by minutely removing the skin or peeling when supplied with water.

18 indicates a reservoir secured to the outer or upper surface of the back and provided with a friction cap 19 closing the upper end thereof. The cap is provided with a hole 20 preferably at its center which is normally guarded by a flat cork disk 21 within the reservoir.

Preparatory to the operation of this implement, it is immersed in water which will flow into the reservoir filling the same and causing the disk 21 to be buoyed up against the cap practically sealing the same or at least preventing the splashing of the water out through the hole 20. As above premised, any suitable number of the punctures within the bottom of the reservoir may be left open during the application of the abrasive material 17 to the body so that water from the reservoir will be dispensed through the pores as provided, keeping the surface of the potato flushed while the abrasive operation is carried on. The water thus dispensed from the reservoir serves at least three important functions: First, it supplies the surface of the vegetable with water rendering the skin or peeling more easily attacked by the sharpness of the abradant materials, a matter of great importance in practice; secondly, it keeps the vegetable flushed clean so that the operator can always tell how the work is progressing, and thirdly, it keeps the surface of the abrasive implement flushed clean from the particles of peeling, that is to say it prevents the clogging of the interstices of the abrasive surface.

Figure 5:
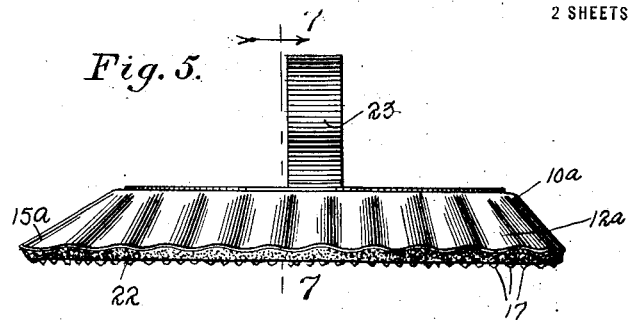
Fig. 5 is a side elevation of a modified form of the invention.
Figure 6:
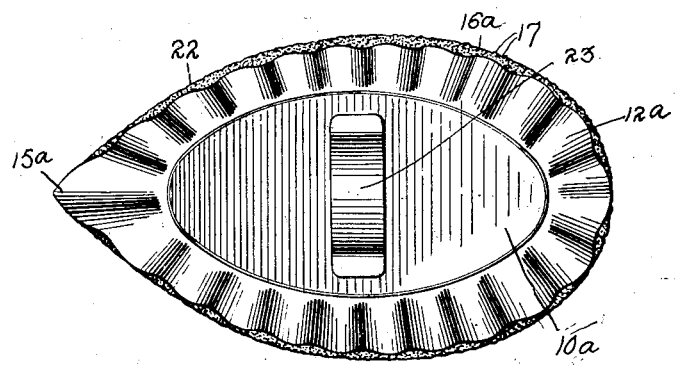
Fig. 6 is a plan view of the same.
Figure 7:
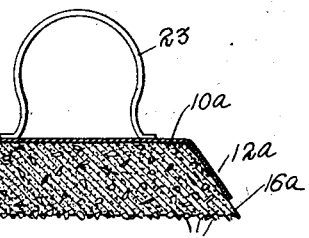
Fig. 7 is a vertical horizontal section on the line 7—7 of Fig. 5.

The form shown in Figs. 5 to 7 provides an inverted saucer like body 10$^a$ having a fluted edge 12$^a$. This body in its concave side is filled with a mass comprising abrasive material 17 impregnated in a mass of cement or other suitable plastic material 16$^a$. As indicated in Fig. 7 the abradant material may be impregnated throughout the mass of plastic material, but if desired the sharp cutting material may be impregnated only along the surface of the plastic material or cement. At any desired place or places the body 10 may be provided with reduced portions or extensions such as indicated at 15$^a$ for a purpose fully explained above either alone or in connection with the exposed serrated edges 22.

In place of the reservoir 18 of water I provide a finger piece or handle 23 rigidly secured to the back portion of the body whereby the operator has a more positive control or grip upon the implement. Obviously in the use of this form of the invention the work must be performed in a pan or under a stream of running water for flushing and other purposes referred to above.

Figure 8:
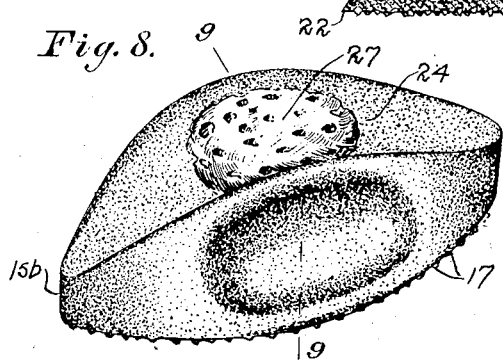
Fig. 8 is a perspective view of a further modification.
Figure 9:
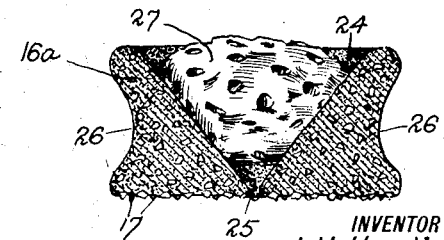
Fig. 9 is a vertical transverse section on the line 9—9 of Fig. 8.

In Figs. 8 and 9 I show a form of the invention in which no metal back or shell is used, but rather the device consists essentially of a mass of cement 16$^a$ or other suitable plastic material impregnated with the abrasive material as in Fig. 7 and molded or formed into proper shape and size including a central cavity 24 in the form of a funnel leading from the center of the back to and through a small hole 25 in the center of the active face of the device for a purpose similar to that set forth above in connection with the holes 11. I provide also oppositely located cavities or depressions 26 formed in the side walls of the body of the device which as a whole is practically oval in plan view, having one end 15$^b$ more pointed or acute than the other or substantially the same form as shown in Fig. 6. The depressions or cavities 26 afford an easy finger grip while holding and manipulating the device.

Figure 2:
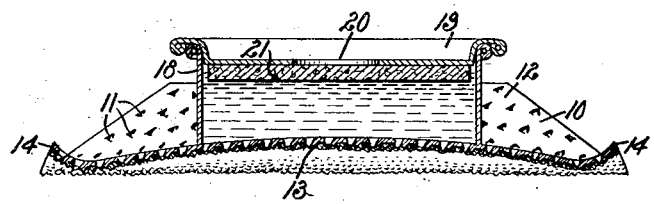
Fig. 2 is a vertical longitudinal section on the line 2—2 of Fig. 1.
Figure 3:
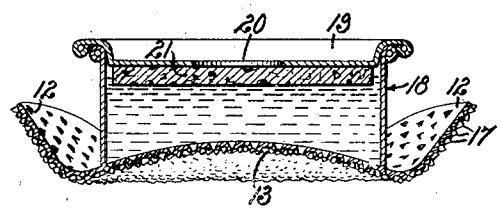
Fig. 3 is a transverse section on the line 3—3 of Fig. 1.

The cavity 24 accommodates a water container indicated as in the form of a sponge 27, but obviously a receptacle of a nature similar to that of Figs. 1, 2 and 3 might be attached to this form of the invention and for similar purposes. The sponge serves very satisfactorily in retaining a sufficient quantity of water to keep the active surface of the device flushed and for the other purposes set forth in connection with the first set of figures.

I claim:

1. The herein described potato peeling device comprising a body of rigid abrasive material having a plastic and gritty sharp and abrasive surface, an edge of the body serving as a cutting device for removing the eyes of the potatoes.

2. A vegetable peeler, comprising an apertured sheet metal body having peripheral lips or points, a cementitious material containing an abrasive material applied to the body and having openings registering with the openings of the body, and a water reservoir on the upper surface of the body and in communication with the openings of the body and the cementitious material.

3. In a potato peeling device, the combination of a box provided with a bottom formed with an outside concave surface, a hard composition impregnated with gritty abrading materials on the outside of the bottom, a plurality of perforations through the bottom and the abrading material which will allow a limited flow of water therethrough, and a cover on said box provided with a check valve.

4. A potato peeler, comprising a body having an abrasive lower face and provided with openings leading through the abrasive surface, a water chamber on the upper face of the body and having an apertured top, and a cork disk in the reservoir for closing the aperture of the top of the chamber.

JOHN H. HAMLIN,